Figure 3:
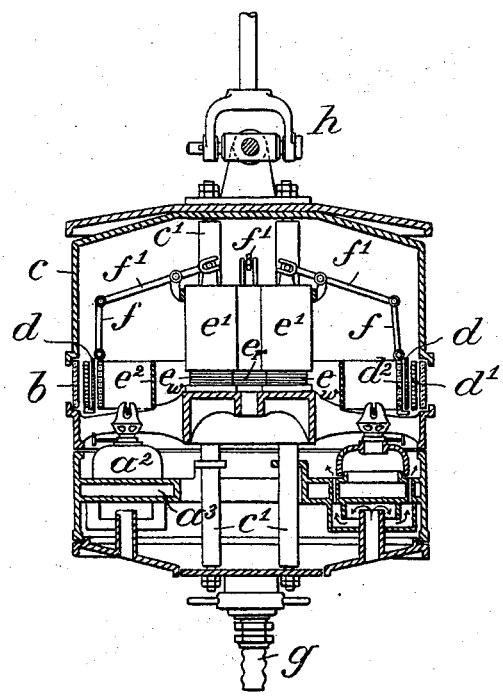

(No Model.) 10 Sheets—Sheet 1.
L. SELLNER.
APPARATUS FOR VISIBLE SIGNALING.
No. 599,742. Patented Mar. 1, 1898.
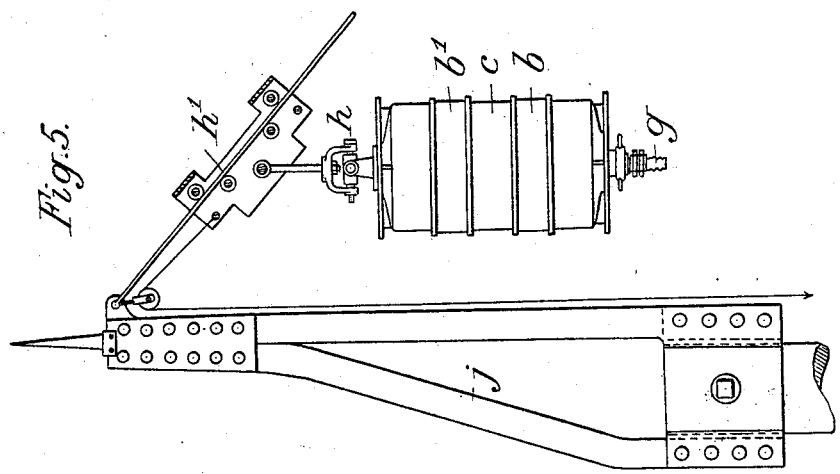
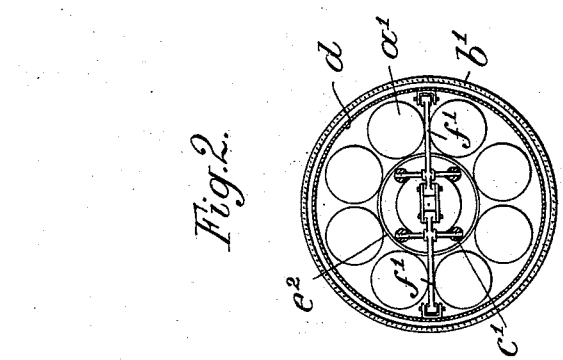
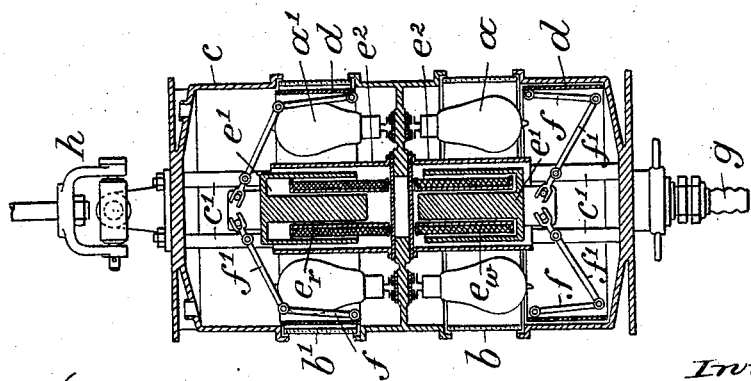
Witnesses
Inventor.
Leopold Sellner.
By
Atty.

(No Model.)

10 Sheets—Sheet 2.

L. SELLNER.
APPARATUS FOR VISIBLE SIGNALING.

No. 599,742.

Patented Mar. 1, 1898.

Witnesses

Inventor
Leopold Sellner
By [signature]
Atty.

(No Model.) 10 Sheets—Sheet 3.

L. SELLNER.
APPARATUS FOR VISIBLE SIGNALING.

No. 599,742. Patented Mar. 1, 1898.

Witnesses:

Inventor:
Leopold Sellner.
By
Atty.

(No Model.) 10 Sheets—Sheet 4.

L. SELLNER.
APPARATUS FOR VISIBLE SIGNALING.

No. 599,742. Patented Mar. 1, 1898.

Witnesses:

Inventor:
Leopold Sellner.
By [signature]
Atty.

(No Model.)                                          10 Sheets—Sheet 5.
L. SELLNER.
APPARATUS FOR VISIBLE SIGNALING.
No. 599,742.                              Patented Mar. 1, 1898.
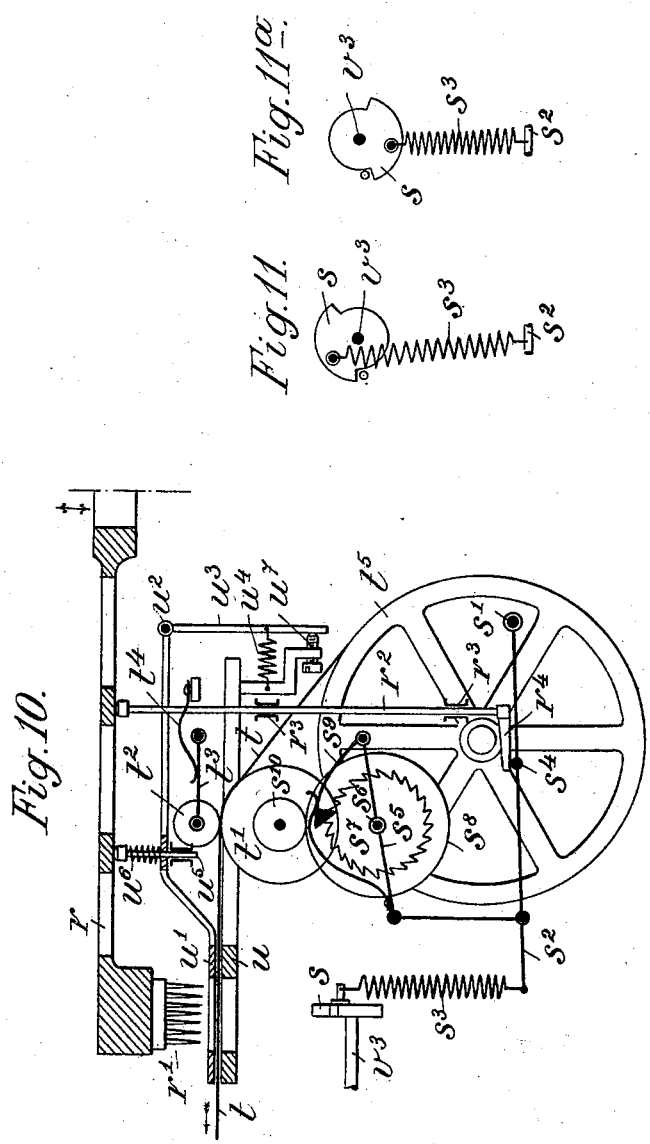
Witnesses:                                Inventor,
                                          Leopold Sellner,
                                          By
                                                    Atty.

(No Model.) 10 Sheets—Sheet 6.

L. SELLNER.
APPARATUS FOR VISIBLE SIGNALING.

No. 599,742. Patented Mar. 1, 1898.

Witnesses:

Inventor,
Leopold Sellner.
By
Atty.

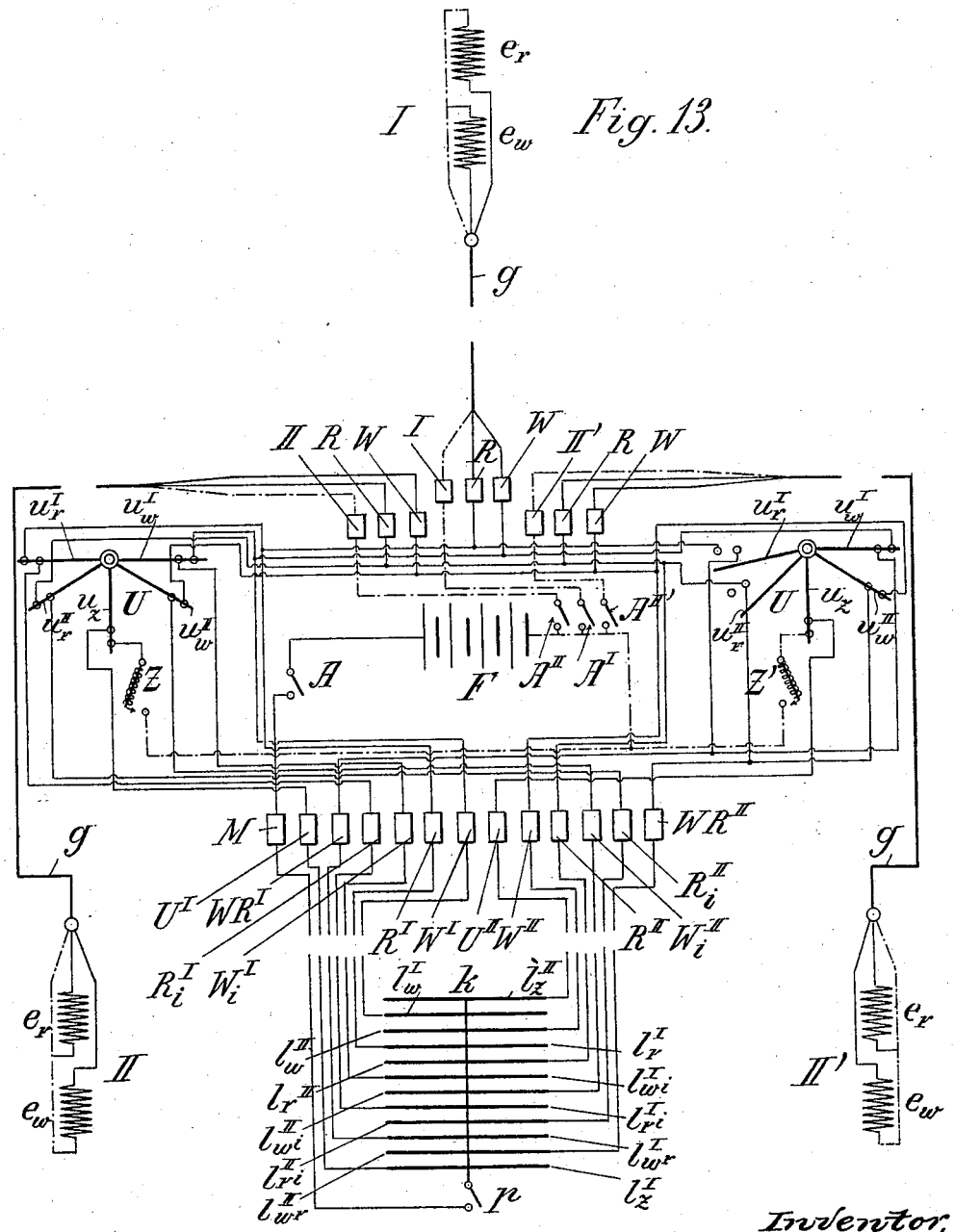

(No Model.) 10 Sheets—Sheet 8.

L. SELLNER.
APPARATUS FOR VISIBLE SIGNALING.

No. 599,742. Patented Mar. 1, 1898.

Witnesses:

Inventor.
Leopold Sellner.
By
Atty.

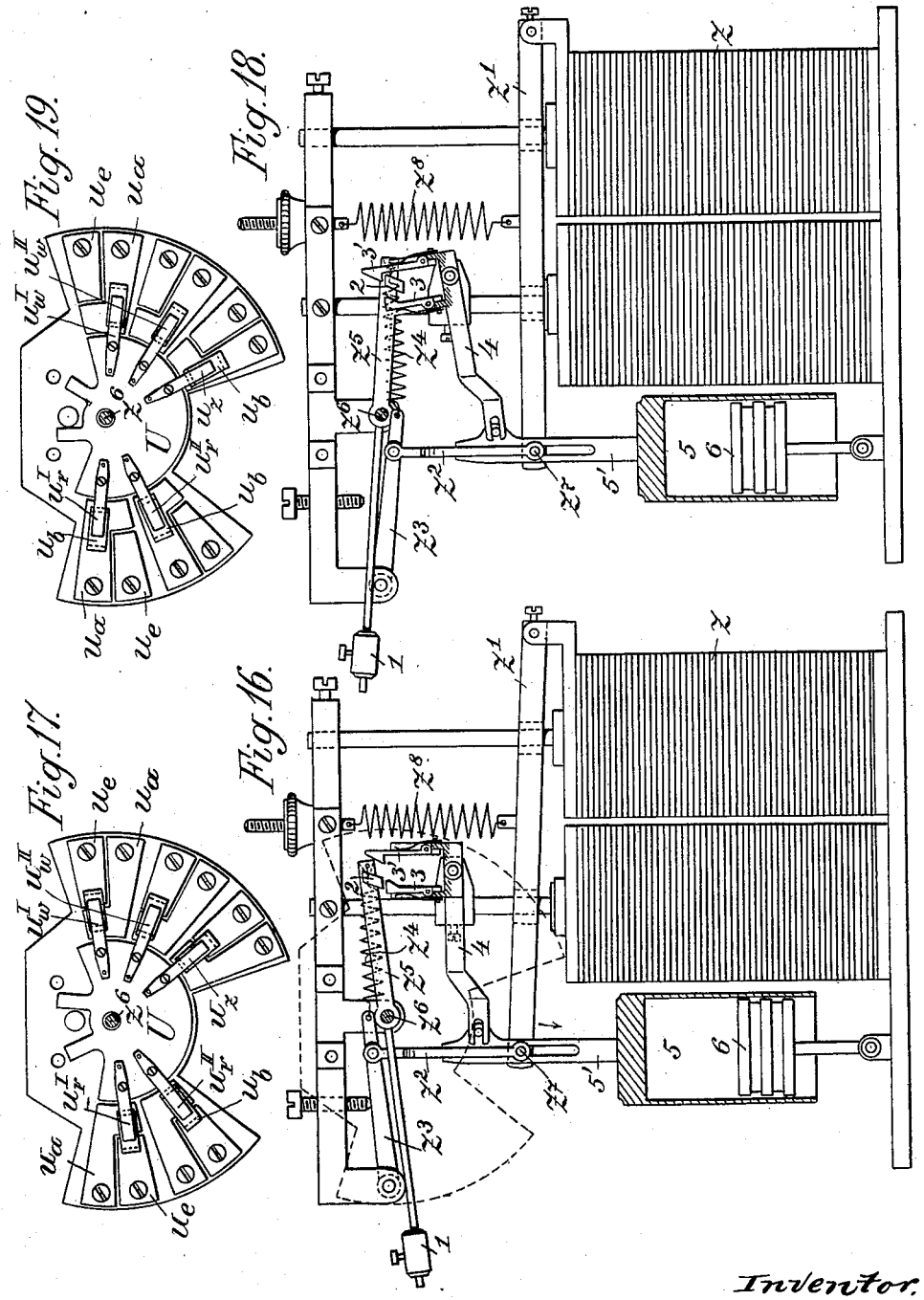

(No Model.)  
L. SELLNER.  
APPARATUS FOR VISIBLE SIGNALING.

No. 599,742. Patented Mar. 1, 1898.

Witnesses:
Inventor:
Leopold Sellner.
By
Atty.

UNITED STATES PATENT OFFICE.

LEOPOLD SELLNER, OF VIENNA, AUSTRIA-HUNGARY.

APPARATUS FOR VISIBLE SIGNALING.

SPECIFICATION forming part of Letters Patent No. 599,742, dated March 1, 1898.

Application filed March 28, 1896. Serial No. 585,248. (No model.)

*To all whom it may concern:*

Be it known that I, LEOPOLD SELLNER, a subject of the Emperor of Austria, residing at Vienna, in the Province of Lower Austria, in the Empire of Austria-Hungary, have invented certain new and useful Improvements in Apparatus for Visible Signaling; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in apparatus for visible signaling, more particularly for use at night and in localities, such as ships, the position of which is liable to be changed, by means of which apparatus two signaling elements (signal-lights) arranged at the greatest possible distance apart are each adapted to show two different main signals, so that by their combination any desired number of combination-signals suitable for signaling purposes can be given. The five main signals of each lantern, when using light of only two colors, are continuous white light, continuous red light, intermittent white light, intermittent red light, and alternate white and red lights. These signals are produced by dividing a signal-lantern having either one or more sources of light in such manner that the one half is adapted to give white light and the other red light. Both parts of the lantern are provided with shutters worked by electrical or mechanical devices, which are actuated by the operator so as either to permit or prevent the passage of the light from the part of the lantern or to alternately permit and prevent such passage for producing intermittent light. Two such signal elements constitute a signaling-station and are situated, respectively, near to the deck of the ship and the top of the mast. At every signaling locality (ship) there are preferably arranged two signaling-stations which together render the signals visible all around the horizon.

The present improvements in such signaling apparatus are as follows:

First. Arrangement of the signal-lanterns, whereby on the one hand any source of light may be used and on the other hand signals can be produced that are transmitted farther, better, and equally over the entire horizon, while at the same time the above-mentioned main signals can be given by means of a simple undivided lantern.

Second. Working devices whereby the duration of the visibility of the light-signals with intermittent or alternating light is automatically determined and whereby, consequently, a synchronous signaling at both signal-stations is attained.

Third. Arrangements at the signal-transmitting apparatus by which the giving of the signals in a simple and at the same time reliable manner is rendered possible and the given signals are registered.

Fourth. The arrangement of the signal elements in such manner at the signaling-station that only three thereof are required for signaling over the entire horizon.

Figure 4:
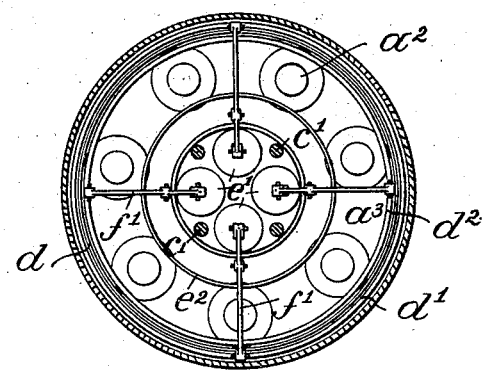
Figure 6:
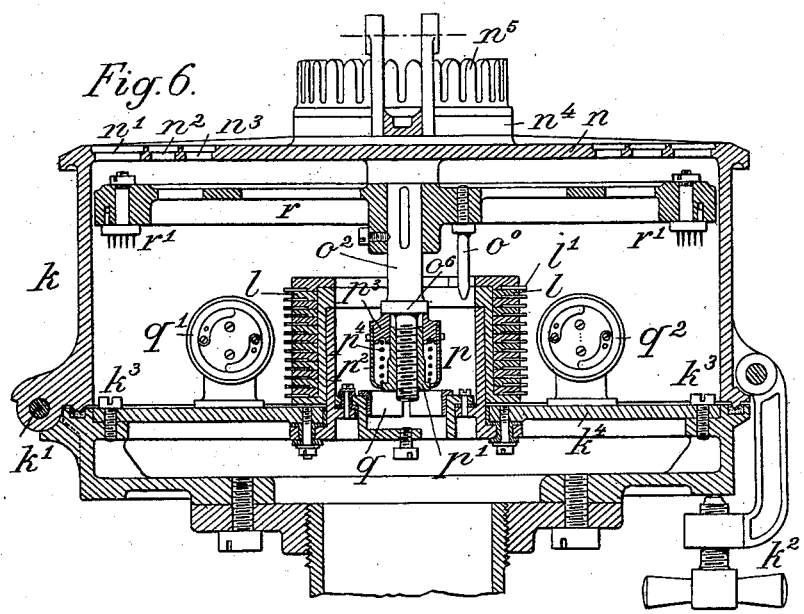
Figure 7:
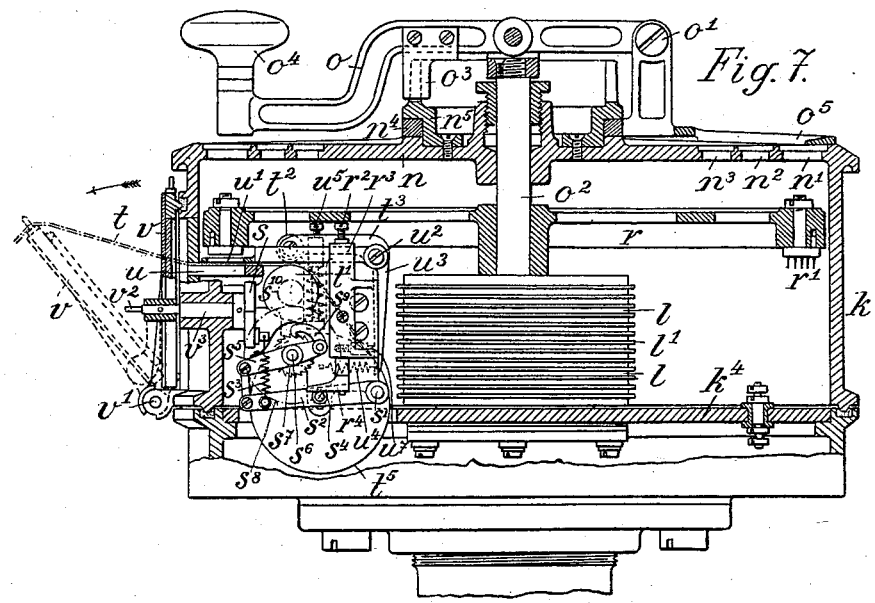
Figure 9:
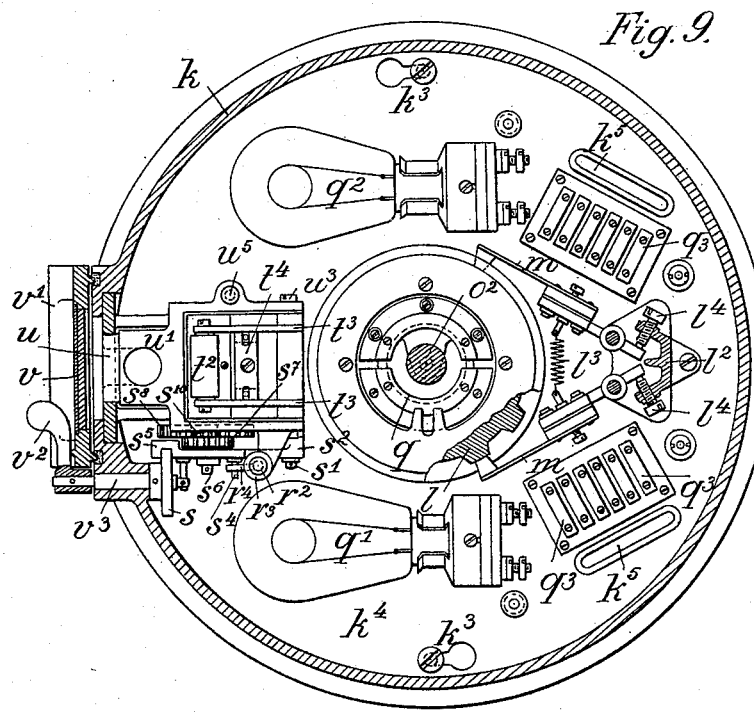
Figure 12:
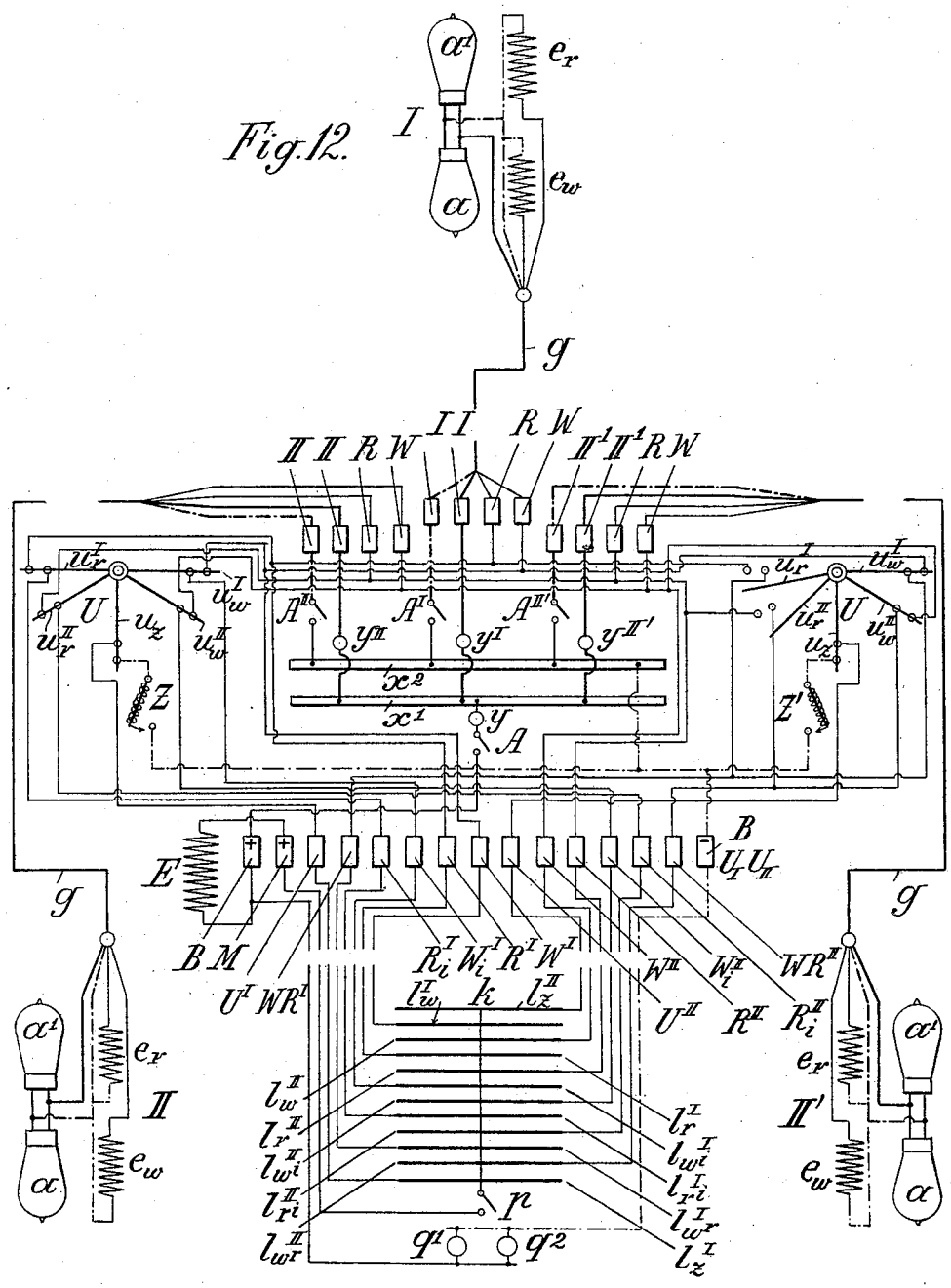
Figure 15:
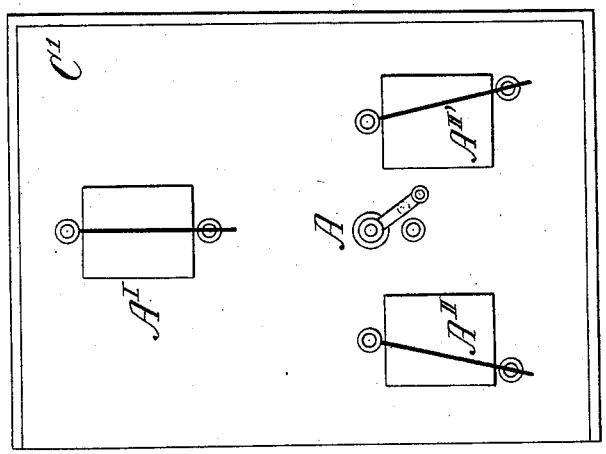
Figure 14:
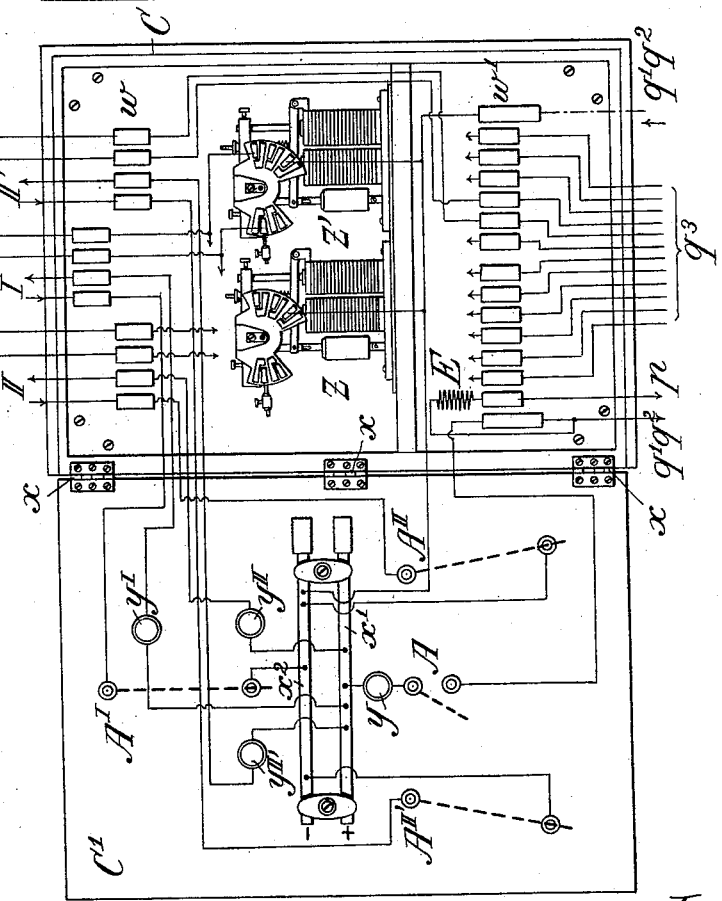

On the accompanying drawings, Figures 1 and 2 show the construction of a divided signal-lantern (signal element) according to the present invention in vertical and horizontal section, in which electric glow-lamps are employed as source of light. Figs. 3 and 4 show similar views of a lantern without division, in which the source of light consists of lamps fed with petroleum, benzin, or other suitable combustible material. Fig. 5 shows the arrangement for the installation of the signaling-lantern at the top of the mast. Figs. 6 to 9 show the construction of the signal-transmitting apparatus and the registering mechanism combined therewith, Figs. 6 and 7 showing two vertical sections at right angles to each other, Fig. 8 a plan, and Fig. 9 a horizontal section. Fig. 10 is a diagrammatic view of the registering apparatus and the releasing device. Figs. 11 and 11ª show two end positions of the releasing device. Figs. 12 and 13 show diagrams of the electrical connections of two signal-stations provided with the said lanterns or signal elements worked with either glow-lamps or petroleum-lamps. Figs. 14 and 15 show the switch apparatus for transmitting signals corresponding to the said diagrams respectively in the open and the closed positions. Figs. 16 to 19 show a switch-relay and the switch apparatus actuated thereby, Figs. 16 and 17 showing an elevation and plan of the same in one position, and Figs. 18 and 19 showing the same views in another position of the parts; Figs. 20 to 23, elevations and plans of ships having such signal-stations with two different arrangements of the lamps or signal elements.

As shown at Figs. 1 to 4, the signal-lantern can either be divided into two halves, of which the one serves to give white light and the other red light, or the lantern can be without a division, in which case it is so arranged that by means of the same source of light signals of both colors can be given.

The sources of light can be of any kind and are so arranged that the light-signals are visible in all directions. With the divided lantern, Figs. 1 and 2, glow-lamps $a$ $a'$ are shown, by way of example, as the sources of light, (or they might be arc-lamps,) these being arranged in each compartment in a circle around the axis of the lantern and surrounded by a white and by a red glass; or for the red lights they may have red globes. Preferably the lamps $a'$, giving a red light and requiring a stronger current, are placed in the upper part of the lantern, so that the heat generated can be made to pass directly outward out of the casing $c$ without acting upon the lower lamps.

Around each group of lamps is arranged a circular shutter $d$, which is vertically movable and which in the one end position is interposed between the lamps and the white or red glass $b$ $b'$, or the opening of the lamp-casing when red bulbs are employed, thereby preventing the emission of light, while in the other end position they leave the lights uncovered for transmission to the receiving-station. By the proper actuation of the shutters of the two lamp groups with two different colors five different main signals can be given—namely, as before stated, white, red, intermittent white, intermittent red, and white and red alternately, in combination with a second similar signaling element, thirty combinations suitable for signaling of any kind can be given. The motion of the shutters can be effected mechanically by means of pulling-cords connected thereto and led over guide-pulleys, or by electrical agency by means of the arrangements shown in the drawings, in which case the shutters $d$ are connected by links $f$ with levers $f'$, which are pivoted to the bars $c'$ of the lantern-casing $c$ and are connected by their short arms with the bell-shaped cores $e'$ of the electromagnets $e_w$ and $e_r$. For each compartment of the lamp is provided an electromagnet, which is arranged centrally in the casing and is surrounded by a shield $e^2$, serving as a reflector. On exciting an electromagnet its core is drawn into the coil, whereby the shutter is shifted so as to allow free passage for the light through the glass $b$ or $b'$. If the current is interrupted, the core is made to resume its original position either by gravity or by spring action, in which position it cuts off the passage of the light. If only the lower electromagnet $e_w$ is excited, a continuous or an intermittent white-light signal is given, according as the circuit is kept closed for a longer or a shorter time or is at short intervals alternately opened and closed. In the same way by actuating the electromagnet $e_r$ of the upper compartment a red light will be continuously or intermittently transmitted. By alternately exciting both electromagnets $e_w$ $e_r$ the fifth main signal (alternate white and red) will be produced.

If the signal-lanterns have no divisions, as at Figs. 3 and 4, the shutter apparatus must be so arranged that with one and the same source of light both colors can be given. For this purpose there are provided behind the colorless glass $b$, surrounding the sources of light $a^2$, arranged concentrically around the central axis of the casing $c$, two concentric rings $d'$ $d^2$, respectively of ground white glass and of red glass, between which is an annular diaphragm $d$ of opaque material. The two glass rings $d'$ $d^2$ are each connected by links $f$ and levers $f'$ to an electromagnet-core or preferably to a pair of cores $e'$, and are provided at their lower edges with beaks, by means of which on raising the one or the other glass ring the diaphragm $d$ is simultaneously raised. Thus if the one or both of the electromagnets $e_w$ is or are excited whose core is connected to the red-glass ring $d^2$ the latter, and with it the diaphragm $d$, will be raised, and consequently a white-light signal will be made visible by means of the white-glass ring $d'$ remaining in position. In the same way on exciting the electromagnet $e_r$, the white-glass ring $d'$ will be raised, and a red signal-light will be transmitted through the ring $d^2$. By suitably regulating the duration of the action of the electromagnet the before-mentioned five main signals can be given. If it is not desired to insure the tranmission to equal distances the white and red lights, the ground-glass ring $d'$ can be omitted and only the red-glass ring $d^2$ and the diaphragm be actuated.

In the arrangement shown the source of light is supposed to be lamps $a^2$, burning petroleum, benzin, or the like, provided with burners either having chimney-glasses or of the form shown at Fig. 3, which render chimney-glasses unnecessary. The lamps are mounted separately upon a common base-plate or a reservoir $a^3$ for the combustible liquid, which is adjustable on the connecting-bars $c'$, so that all the lamps can be simultaneously introduced into or removed from the casing $c$. Of course electric glow-lamps or arc-lamps can also be used in such undivided signal-lanterns. The described signal-lanterns are connected at bottom to a cable $g$, containing electrical conductors for the electromagnets and electric lamps when employed. At the top they are connected by gimbal-rings $h$ to a supporting-stay $h'$ or to a suitable bearer, according to whether the lantern is hung from the topmast or is placed above the deck. As with such lanterns the light issues all around the lantern and in all directions it is not necessary to turn the same if the signals are to be given by means of a single signaling-station over the entire horizon.

For the lantern at the topmast, in order to render the signals visible all around, there is preferably fitted to the end of the mast an upright $j$, Fig. 5, formed of bar-iron, projecting up beyond the mast, which offers practically no obstruction to the light from the lantern, which is hauled up along the aftstay $h'$. As also in consequence of the arrangement of the shutters in the form of shiftable rings none of the emanating rays of light are obstructed thereby when open the lanterns will transmit signals to greater distances and be more distinctly visible than previous constructions.

The supply of current to the electromagnets $e_w$ $e_r$ is effected according to the desired signal-code by means of a signal-transmitter $k$, Figs. 6 to 9, according to the circuit diagram at Figs. 12 and 13. This signal-transmitter consists of a casing carried by a standard at the signaling-station (bridge of the ship) and arranged to turn on a hinge at $k'$ and secured by a screw-clamp $k^2$, the base $k^4$ of which casing, secured by a bayonet-joint fastening $k^3$, carries the contact devices. The latter is formed of a series of twelve rotatable rings $l$, of conducting material, against which bear contact brushes or springs $m$, which are guided on their respective rings by means of insulating-rings $l'$, introduced between each two contact-rings and which project beyond the latter, but which are so arranged, as shown, as not to interfere with the conducting contact between these. The contact-springs $m$ are advantageously arranged in two groups, and each group is rotatably mounted in a support $l^2$, and both groups of springs are connected together by a spring $l^3$, which presses them against the contact-rings $l$, the latter being provided at their periphery with tooth-like projections, Fig. 9, arranged in position to correspond with the signals marked on the signal-board. By means of adjusting-screws $l^4$ pressing against the short arms of the brush-carriers the brushes are prevented after sliding off the projections of the rings $l$ on the turning of these from bearing against the surfaces between the projections, so that contact is only made when the brushes rest on the projections.

Figure 8:
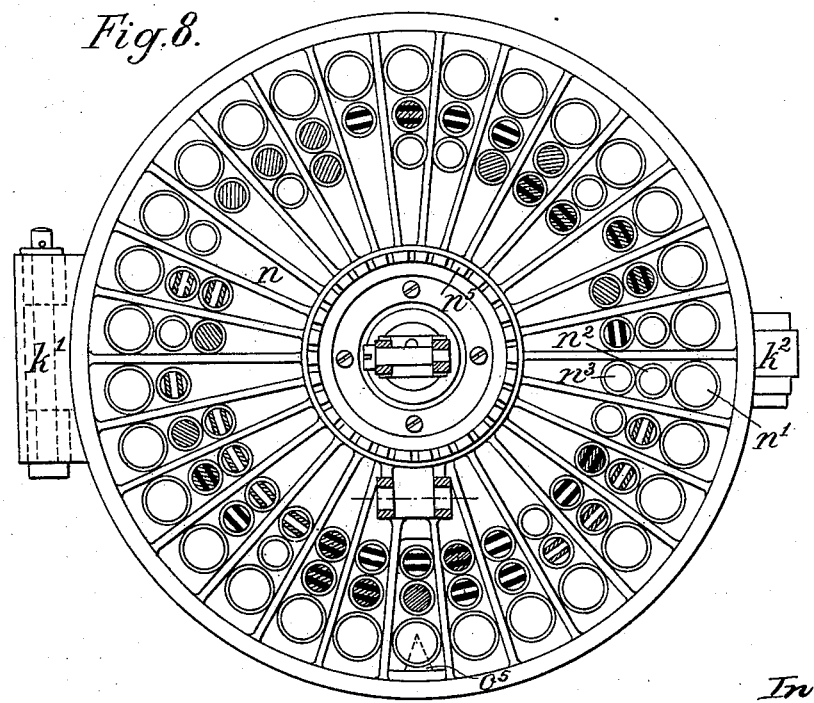

The signal-disk, Fig. 8, forms the cover $n$ of the casing of the signal-transmitter and has three concentric rows of holes $n'$ $n^2$ $n^3$, which are advantageously bored on the dividing-machine. These holes are covered with glass, and the outer row thereof show the signaling-code—that is, by reference letters and numerals corresponding to the signal-book. The holes of the other two rows show the signal elements, respectively, for the upper lantern I and the lower lanterns II and II'.

With the object of enabling the light-signals that are shown at any time to be read with the greatest possible facility at the signal-transmitter $k$ itself, both at the sending-station and at the receiving-station, and thus of enabling the signal when received to be repeated at once without error, the signals are represented on the signal-board with the greatest possible resemblance to the actual signals, the arrangement being such that they are made similar in color (red or white) to the light-signals shown by the signaling-lanterns, while the obscuring or disappearances of the light in intermittent signals and the change of the colors in signals with changing colors are also represented. For this purpose the holes corresponding to the white-light signals are glazed with ground or dead-white glass, the holes corresponding to red-light signals are glazed with red glass, the holes corresponding to the intermittent-light signals (of one color) are glazed with black-striped white or red glass, and the holes corresponding to the alternating rays of light are glazed with glass with alternately red and white stripes. This arrangement is illustrated in Fig. 8, the blank spaces indicating white light and the hatched spaces indicating red light, while the intermittent signal is represented by black stripes in corresponding spaces, and the alternately white and red signal is represented by hatched stripes.

The contact-rings $l$ have projections which, as already stated, are arranged so as to correspond with the aforedescribed kinds of signals, and the said rings $l$ are rotated so that the projection of that ring which is to be set to a signal comes within the reach of the brushes $m$. This rotation is effected by means of the carrier $o^0$, Fig. 6, by an operating-lever $o$, which is pivoted at $o'$ to a ring $n^4$, so as to be capable of turning in a vertical plane, the ring being adapted to rotate horizontally in a groove of the cover $n$ of the casing. To this lever there is connected a vertical rod $o^2$, which extends through the cover of the casing and is capable of being raised and lowered by means of the operating-lever, but which constitutes the axis of rotation of this lever when the latter is turned in a horizontal direction. The said lever is provided with a downwardly knife-edge $o^3$, which enters one of the notches of the fixed crown wheel or ring $n^5$ on the lid of the casing when the operating-lever is pressed down, with the object of locking the said lever after the latter has been rotated in its raised position. The operating-lever has further connected to it a pointer $o^5$, which moves over the signal-board and is arranged diametrically opposite the handle $o^4$.

On the rod $o^2$ there is fixed a "bell cut-out" $p$, Fig. 6, which consists of a sleeve $p'$, firmly screwed upon the screw-threaded end of the rod, of a second sleeve $p^3$, which is movable on the sleeve $p'$ and carries the elastic copper cylinder $p^2$, that surrounds loosely the said sleeve $p'$, and also of a coiled spring $p^4$, inserted between the said two sleeves. This spring keeps the sleeve $p^3$ generally pressed up against a shoulder $o^6$ of the rod $o^2$. Below this bell cut-out there is let into the base-plate $k^4$ a bush $q$, consisting of two halves of a cylinder insulated from each other and from the base-plate, the parts of said bush being connected, respectively, with the contact-rings $l$ and with collecting-bars $x'$ $x^2$, Fig. 14, that are supplied with current from a source of electricity, such as a dynamo or a battery. On pressing down the operating-lever $o$ the copper cylinder $p^2$ is forced with rubbing action into the bush, thereby effecting electrical connection between the halves of the bush. On again lifting out the operating-lever the copper cylinder of the bell cut-out is retained for a short time in the bush $q$ by friction, whereby the sleeve $p^3$ is held fast, and the spring $p^4$ is compressed in consequence of the movement of the rod $o^2$; but as soon as the tension of the spring overcomes the resistance produced by the friction of the copper cylinder $p^2$ in the bush $q$ the spring causes the copper cylinder to be drawn quickly back and thereby to suddenly interrupt the current. The bell cut-out thus acts as a spring-contact.

On the base-plate $k^4$ of the casing there are mounted, further, the glow-lamps $q'$ $q^2$, that serve to illuminate the signal-board provided in the cover, and also the screw-terminals $q^3$, which are united together in two groups similarly to the brushes $m$ and are respectively connected to the wires of the conducting-cable, that are introduced through slots $k^5$ in the base-plate of the casing and to the corresponding brushes.

In the casing of the signaling device $k$ there is also arranged the registering or recording apparatus, Figs. 7 and 10, which serves to record the transmitted signals in the same manner as they are marked on the signal-board, whereby, first, a special writing down of the transmitted signals is rendered unnecessary, and, secondly, a permanent and immediate check is provided on the nature and serial order of the signals that have been previously transmitted. For this purpose this recording apparatus consists of a type-wheel $r$, which is fixed on the rod $o^2$ below the cover of the casing and therefore partakes of the rotation and shifting movement of said rod. To the said wheel $r$ is fixed the carrier $o^9$, and it has fixed in its rim the types $r'$, that are composed of needles, (arranged in groups in accordance with the various representations of the signals.) Along the under side of the wheel $r$ there rubs a stud $r^2$, the rod of which is movable in a sleeve $r^3$ and is kept pressed up against the wheel by means of a spring $s^3$, which is connected at one end to the eccentric disk or cam $s$ and at its other end to the one-armed lever $s^2$, that is pivoted at $s'$. The spring $s^3$ presses, by means of the lever-pin $s^4$, upon the nose $r^4$ of the rod of the stud $r^2$, and consequently has a constant tendency to raise the latter.

To the lever $s^2$ there is linked a two-armed lever $s^5$, whose axis $s^6$ carries a ratchet-wheel $s^7$ and a toothed wheel or friction-wheel $s^8$, while the free end of this lever carries a pawl $s^9$, that is subjected to spring-pressure. This pawl is arranged in such a manner as to slide (in the left-hand direction) over the teeth of the ratchet-wheel when the stud $r^2$ is pressed down—that is to say, when the rod $o^2$ and the type-wheel $r$ are depressed. On the stud being raised by means of the previously-energized spring $s^3$, when the operating-lever $o$ is lifted, the aforesaid pawl engages with the ratchet-wheel $s^7$ and rotates the latter. By this means both the wheel $s^8$ and the pinion $s^{10}$, gearing therewith, are rotated, the latter being mounted on the shaft of the roller $t'$, which serves to feed a recording-strip $t$ forward. This roller $t'$ works together with a second roller $t^2$, which is supported in two pivoted arms $t^3$ and which is pressed by means of a spring $t^4$, (bearing with adjustable pressure upon the said arms,) Figs. 9 and 10, against the recording-strip that is drawn off from the paper-reel $t^5$ between the two rollers. This recording-strip after passing the feed-rollers passes over a table or plate $u$, which is provided with an opening to allow of the passage through it of needles of a type when the latter is moved down by the depression of the operating-lever. In order that the strip shall remain stretched during this movement of the type-needles and shall be pierced with certainty by the needles, there is arranged above the table $u$ a clamping-plate $u'$, which is also provided with an opening for the passage of the needles and which is pivoted at $u^2$ and is connected to a lever $u^3$. This lever is caused by the pull of a spring $u^4$ to keep the clamping-plate usually raised, while a stud $u^5$, movably mounted on the latter, is kept by the pressure of a spring $u^6$, Fig. 10, pressed up against the lower surface of the type-wheel $r$. When the latter is moved down, this stud $u^5$, and with it the clamping-plate $u'$, are moved down with the latter, bears upon the table—i. e., the recording-strip situated on the same. A set-screw $u^7$, acting on the lever $u^3$, serves to determine the amount of the downward movement, so that as the type-wheel is pressed farther downward the stud $u^5$ will alone move down, thereby placing its spring $u^6$ in tension at the same time.

The strip marked with the character to be recorded is, by the depression of the operating-lever and type-wheel, fed along by means of the rollers $t'$ $t^2$ immediately after the lever is raised by the action of the ratchet-feeding mechanism consequent therewith, the clamping-plate being raised at the same time. In order that the character perforated in accordance with a determined signal shall at once move out of the signal-transmitter and thus become visible, the type-wheel $r$ is made of as large a diameter as possible and the types are arranged on the same near to the periphery of the casing. The strip passes out through an aperture in the wall of the casing, which is adapted to be closed by a flap $v$. This flap is provided on its inner side with a mirror-like reflecting-surface and is capable of turning outward on a hinge $v'$ until it assumes a determined angular position relatively to the wall of the casing, Fig. 7, whereby the rays emitted from the sources of light situated in the signal-transmitter are reflected so as to illuminate the recording-strip or the characters pierced therein from underneath, and thus render them visible. The flap $v$ is fastened in its closed position by means of a bolt $v^2$.

In order to prevent the strip from being fed forward by the operation of the signal-transmitter while the flap is closed, which would cause a crowding of the moving strip between the table and the flap, and consequently produce interruptions or a breakdown, the spring $s^3$, which holds up the stud $r^2$ of the recording device and actuates the ratchet mechanism, is fixed to the cam $s$, which is mounted on the axle $v^3$ of the locking-bolt $v^2$ and is adapted to be rotated therewith to the extent of the angle necessary for opening or locking said bolt. In the latter case the cam is moved into a position such that the spring $s^3$ is slackened, Fig. 11$^a$, and the ratchet mechanism remains out of operation. The said mechanism cannot therefore come into operation when the operating-lever $o$ is raised, so that the strip is not fed forward until the flap is opened and the spring $s^3$ is again energized thereby, Fig. 11.

All the movable parts of the casing of the signal-transmitter are made to close tight at the joints. Similarly the rod $o^2$ of the bell cut-out is carried through a stuffing-box in order to prevent as far as possible moisture from penetrating into the signal-transmitter.

The ring $n^5$ is made of the smallest possible diameter and is provided with exit-holes for carrying off any rain-water that may collect inside the same, so that the said rain-water can run off over the cover of the casing of the signaling device without interfering with the reading of the signals of the signal-board.

The contact-rings $l$ of the signaling device are marked in the diagrams of connections illustrated in Figs. 12 and 13, $l^I_w$ $l^{II}_w$ $l^I_r$ $l^{II}_r$ $l^I_{wi}$ $l^{II}_{wi}$ $l^I_{ri}$ $l^{II}_{ri}$ $l^I_{wr}$ $l^{II}_{wr}$, correspondingly with the signals which can be given by combining these rings with the upper lantern I or the lower lanterns II II'. The lowermost and uppermost rings $l^I_z$ and $l^{II}_z$ serve in this connection for the purpose of throwing relays into gear which effect the shifting of the switch for the purpose of producing intermittent light-signals and light-signals that appear alternately in different colors, and at the same time accurately and regularly determine in the former case the duration of the "obscurations" or periods of darkness between any two flashes of light, and in the latter case the duration of the visibility of a light of one color, so that a perfectly synchronous signaling is rendered possible. These relays, which are constructed in a peculiar manner for the special purpose to which they are to be put, are mounted in a switch-board which serves to electrically connect the signal-lanterns with the signal-transmitter and the source of electricity. It consists, as shown in Figs. 14 and 15, of a small box C, arranged near the signal-transmitter $k$, into which box there are introduced the conducting-cables from the lantern I and II II', the connecting-cable from the signal-transmitter, and the supply and return leads to and from the source of electricity. In the said box there are arranged the two relays Z Z' (the construction of which is described hereinafter) and two groups of screw-terminals $w$ $w'$, one group $w$ of which consists of twelve terminals, two for connecting with the leads of the electromagnet and two for connecting with the light-leads of each of the three lanterns. The lower terminals $w'$ are connected with the terminals $q^3$ in the signaling device, (for the contact-rings $l$.) Furthermore, there are provided two terminals for connection with the illuminating-lamps $q'$ $q^2$ in the signal-transmitter and a terminal for the bell cut-out switch $p$. The cover C' of the small box is pivoted in hinges $x$ for the purpose of opening and closing, and carries on its inner side the collecting-bars $x'$ $x^2$, to which the supply-leads of the source of electricity are connected. To the collecting-bar $x'$ there are attached the three supply-leads of the lantern-cables $g$, (through the lead safety-fuses $y^I$ $y^{II}$ $y^{III}$,) while the return-leads of these light-leads pass over the cut-outs $A^I$ $A^{II}$ $A^{III}$ to the collecting-bar $x^2$. The supply-lead to the bell cut-out and to the illuminating-lamps in the signal-transmitter branches off from the collecting-bar $x'$, through the safety-fuse $y$, and over the cut-out A. The return-lead of the illuminating-lamps is carried to the other collecting-bar $x^2$, while the return-lead of the bell cut-out is situated in the light-lead of each signaling-lantern, as shown in Fig. 12. The relays Z Z', Figs. 16 to 18, necessary for producing the intermittent light-signals and the alternate color-signals are of the same construction and differ only in respect of the duration of their operation. Each of the said relays consists of an electromagnet $z$, whose armature $z'$ is connected by means of a forked radius-rod $z^2$ with a lever $z^3$, which is connected at its free end by means of the tension-springs $z^4$ (arranged in pairs) with the end of the drop-lever $z^5$. The pivot $z^6$ of the latter serves also as the axis of the switch U, Figs. 17 and 19, which consists of five radial arms $u^I_w$, $u^{II}_w$, $u^I_r$, $u^{II}_r$, and $u_z$, that serve, respectively, for throwing into and out of operation the white and red light in the upper and lower lanterns—that is to say, the respective electromagnet-leads—and also for placing the relay itself in and out of action. For this purpose the switch U is capable of executing an oscillating or rocking movement about its axis in both directions, the arrangement being such that its arms slide each with the end of bridges $u_b$ over a pair of contact-pieces $u_c$ and $u_a$. These bridges are mounted on these arms in such a manner as to be capable of rotating at right angles to their plane of oscillation and are pressed by springs, so as to be capable of adjusting themselves automatically for the purpose of effecting a permanently effective contact. Of the contact-pieces $u_c$ $u_a$ the latter are longer than the former and bear with a lateral shoulder in the prolongation of the contact-pieces $u_c$, (insulated therefrom,) so that when the switch-arms are in one position the said contact-pieces are electrically connected together by means of the bridges, whereas when these arms are in another position the said contact-pieces are electrically separated from each other.

The switch U, Figs. 17 and 19, is counterbalanced by means of an adjustable weight 1, and its drop-lever $z^5$ is provided with a tappet 2, against which two spring-pawls 3 3' are pressed—viz., one pawl on the upstroke and the other pawl on the downstroke of the drop-lever—and with this object they are carried along in the respective direction by means of a forked arm 4, which engages with the slotted rod 5' of an air-pump cylinder 5, said rod 5' being capable of being freely moved down on the cross-pin $z^7$ of the electromagnet-armature $z'$. The said air-pump cylinder is adapted to move on a piston 6, which is formed with holes or grooves, so as to allow the air contained in the cylinder to pass out slowly from the latter when the cylinder moves down, and thereby to break the descent of the cylinder, whereas it is designed to allow of the indrawing of air when the cylinder is rising. The two pawls 3 3' meanwhile maintain the drop-lever in dependence upon the pump, so that the said lever can become disengaged at the desired moment of the up or down stroke.

The electromagnet-armature is further provided with a return or separating spring $z^8$ in the ordinary manner. Instead of the latter and the tension-spring $z^4$ weights may be employed to produce the same result. On current passing the armature is attracted and moved down, the lever $z^3$, connected with the armature, being moved down and the switch-springs $z^4$, attached thereon and to the drop-lever $z^5$, becoming stressed, while by the movement of the lever $z^3$ they are placed at a downward inclination with reference to the drop-lever. At the same time the return-spring $z^8$ is stressed. The pump-cylinder, which sinks down by its own weight, requires a certain time for displacing the air which is in the cylinder and which acts as a brake therefor, Fig. 18. Meanwhile the relay and signal contact-arm, moved or set by the signaling device, is caused by the energizing of the relay to come into operation and the corresponding lamp is illuminated—that is to say, its shutter is so moved as to allow its light to be visible. When the pump-cylinder has sunk down till the forked arm 4 (that is carried along by the same and acts during this time upon the pawls 3 3') has thrown the pawl 3 out of operation, the drop-lever $z^5$ is, with the aid of the switch-springs $z^4$, caused to fall, the pawl 3' is brought over the tappet, and the switch is thereby reversed. By the rotation of the latter the relay and signal contact-arm moves into the inoperative position, Fig. 19, so that the relay is deprived of current and the shutter cuts off the light of the lamp. As soon as the relay is without current the armature is pulled off by its spring $z^8$, whereby the drop-lever $z^5$ (which is released at the proper moment from the pawl 3') is raised and the switch is rotated back into its operative position, Figs. 16 and 17, in which the shutter is opened and the light is allowed to pass out of the lantern or respective portion of the lantern. As the relay-circuit is also closed at the same time, the armature is attracted afresh, and the whole series of operations is repeated in the same manner at regular intervals, with the result that the corresponding lantern or part of the lantern is allowed to emit a white or red light intermittently at short intervals. The second relay Z' is of similar construction, only that the signal contact-arms are changed or shifted from the contact for white light to that for red light, and vice versa. Moreover, the air-pump is made somewhat larger in order to produce longer intervals for the white and red changing light than is necessary for intermittent signals.

Instead of the relays there may also be employed a contact-roller, (driven by spring-power or by means of a weight,) which is provided for this purpose with full contact-rings for continuous light and with interrupted contact-rings for intermittent light, the arrangement being such that the last-mentioned rings are arranged, shifted relatively to each other, with the object of giving signals, which shall appear alternately in the two colors of the lights, so that during the duration of the disappearance of the light of one color the light of the other color will be visible.

The mode of operation of the signaling apparatus and the manner of giving signals are illustrated by the diagrams of connections shown in Figs. 12 and 13.

The diagram of connections suitable for signaling-lanterns with electric incandescent lamps and illustrated in Fig. 12 shows the signal-transmitter $k$, with its contact-rings $l$, the bell cut-out $p$, and the illuminating-lamps $q'$ $q^2$, also the parts of the switchboard, (collecting-bars $x'$ $x^2$, cut-out A A$^I$ A$^{II}$ A$^{III}$, the two relays Z Z', and the clamps $w w'$,) and the three signal elements I, II, and II', which are represented, for the sake of simplicity, each by a pair of glow-lamps and the corresponding pair of electromagnets $e_w$ $e_r$.

All the supply-leads are indicated by full lines and the return-leads by dash-dotted lines.

The clamps or terminals $w$ for each lantern are marked, respectively, I I W R, II II W R, and II' II' W R, W and R indicating the terminals of the electromagnet-leads, and I I II II II' II' the terminals of the light or lamp leads.

The lower terminals $w'$ of the switchboard are the illuminating-terminal $+$B (connected to the cut-out A) for the (positive) supply-lead to the illuminating-lamps $q'$ $q^2$ of the signaling device $k$, from which terminal a branch, in which is inserted a resistance E, leads to the positive terminal M of the electromagnet-lead, which is connected to the bell cut-out $p$. The resistance E is inserted with the object of reducing the strong current (required by the illuminating-lamps) down to the voltage for energizing the electromagnets in the signaling-lanterns, for which a relatively weak current is necessary. There is, further, a terminal U', which connects the relay-arm $u_z$ of the relay Z, intended for intermittent light, with the relay contact-ring $l^{II}_z$. There are also terminals $W^I$ $R^I$ $W^{II}$ $R^{II}$ for direct electrical connection of the contact-rings $l'_w$ $l'_r$ $l''_w$-$l''_r$ with the lanterns-terminals $W^I_i$ $R^I_i$ $W^{II}_i$ $R^{II}_i$ $W$ $R^I$ $W$ $R^{II}$, which serve to connect the respective contact-rings $l^I_{wi}$ $l^I_{ri}$ $l^{II}_{wi}$ $l^{II}_{ri}$ $l^I_{wr}$ $l^{II}_{wr}$ with the contact-pieces $u_c$ for the respective contact-arms $u^I_w$, $u^I_r$, $u^{II}_w$, $u^{II}_r$, and $u_z$ of the two relays, branch leads being provided to the contact-arms which serve to effect the throwing into operation of the white and red light. Finally, there is also a terminal $U^{II}$, which connects the second relay contact-ring of the signal-transmitter with the relay-arm $u_z$ of the relay Z' for changing or alternating light, and a terminal B $U^I$ $U^{II}$, to which are led the return-lead from the illuminating-lamps $q'$ $q^2$ of the signaling device and the lead that is divided and connected to the switch-arms $u_z$ of the two relays Z Z'.

In order to set the apparatus in operation, (the signals being visible over the entire horizon,) first, before signaling can be begun all the cut-outs A $A^I$ $A^{II}$ $A^{II'}$ in the switchboard must be closed, thereby lighting up the glow-lamps in the several lanterns I, II, and II'. By closing the cut-outs $A^I$ $A^{II}$ $A^{II'}$ for the three lamps the current passes from the one collecting-bar $x'$ over the lead seal $y^I$ $y^{II}$ $y^{III}$ to the lanterns and back from the latter to the other collecting-bar $x^2$, the annular shutters remaining closed. On closing the cut-out A the current passes from the one collecting-bar $x'$ over the lead-fuse $y$ and the cut-out A to the terminal $+$B and thence to the lamps $q'$ $q^2$ of the signaling device, whereby these lamps are lighted, and back again through the terminal $-$B to the second collecting-bar $x^2$. At the same time a branch current passes from the terminal $+$B over the resistance E to the bell cut-out $p$ of the signaling device. Assuming now that it is desired to signal with the upper lantern I alone and the signal "continuous white light" is to be given, then in this case the operating-lever $o$ of the signaling device is set to the signal $w'$, and by depressing this lever the bell cut-out $p$ is closed. The current entering through the contact-ring $l^I_w$ passes through the terminal W' to the terminal W of the lantern I in the upper group of terminals, thence into the lantern-cable $g$, and energizes the electromagnet $e_w$, whereby the shutter of the lamps emitting white light is raised. The currents return through the return-lead of the light-lead and the cut-out $A^I$ to the collecting-bar $x^2$. If it is desired to give an intermittent—for instance, red—signal, then on the signaling device being set to this signal $r^I_i$ the current traverses the bell cut-out and the ring $l^I_{ri}$ to the terminal $R^I_i$, the switch-arm $u^I_r$ of the left-hand relay Z, through this switch to the upper terminal R, and to the lantern-cable $g$ of the lantern I, energizing the electromagnet $e_r$. At the same time the relay contact-ring $l^I_z$ in the signaling device is included in the circuit, thereby conducting the current to the terminal $U^I$ and to the switch U for the purpose of actuating the relay Z and thence to the collecting-bar $x^2$. The current to the lamp is interrupted by the relay, and then the relay-current is interrupted, and so on, which produces a rising and falling (repeated at determined and equidistant intervals) of the annular shutter of the upper part of the lantern giving red light. When the signal "white and red alternately" is given, the contact-rings $l^I_{wr}$ and $l^{II}_z$ are thrown into circuit by means of the operating-lever. The course of the current is then as follows: to the terminal W $R^I$, and thence to the contact-arm $u^I_w$, and also to the contact-arm $u^I_r$ of the relay Z'. The current through the relay-circuit, which is closed at the same time, passes through the contact-ring $l^{II}_z$ to the switch for the relay Z' and through the relay to the second collecting-bar $x^2$. By this means the contact-arms $u^I_w$ and $u^I_r$ are brought alternately into the closed position, and consequently from them the current is led alternately to the electromagnets $e_w$ and $e_r$ of the lantern I, whereby the two annular shutters thereof are moved alternately.

In signaling with two (or three) lanterns—when, for instance, red light is to be shown by the upper lantern and white intermittent light is to be shown by the lower lantern—the contact-rings $l^I_r$, $l^{II}_{wi}$, and $l^I_z$ are placed in circuit. The current then passes from the contact-ring $l^I_r$ to the terminal $R^I$, thence to the upper terminal R, and to the lantern-cable $g$ of the lantern I, and on the other hand, also, from the contact-ring $l^{II}_{wi}$ to the terminal $W^{II}_i$ and to the switch of the left-hand relay Z, thence to the two terminals W of the lanterns II II'. From the relay contact-ring $l^I_{z1}$ a current passes at the same time through the terminal $U^I$ to the relay-switch of Z, whereby this relay is brought into operation, and therefore produces an intermittent white-light signal in the lower lamps.

When lamps fed with petroleum or other combustibles are employed, the light-leads are omitted, and there is then employed as the source of electricity with advantage a battery F, as shown in the diagram of connections, Fig. 13.

In the switchboard there are also arranged a number of cut-outs corresponding to the number of lanterns employed for signaling, of which one cut-out serves for the supply-lead to the signal-transmitter $k$. The terminals $w$ and $w'$ are arranged in the same manner, only the terminals $+B - B$, for illuminating the signaling device $h$ and the resistance E, are omitted. With lanterns arranged in this manner when it is desired to give the signal "upper lantern to show red intermittent light, the lower lanterns to show white and red light alternately," the contact-rings $l^I_{ri} l^{II}_{wr}$ and $l^I_z l^{II}_z$ in the signal-transmitter are placed in circuit by means of the operating-lever. The path of the current is then as follows: from the contact-ring $l^I_{ri}$ to the terminal $R^I_i$, to the switch of the relay Z, through the upper terminal R and the electromagnet $e_r$ of the upper lantern I, back through the cable to the terminal, and through the cut-out $A^I$ to the battery. After the relay Z has also been placed in circuit its action produces the intermittency of the red signal-light of the upper lantern. From the contact-ring $l^{II}_{wr}$ there passes at the same time a current to the terminal W $R^{II}$ and to the contact-pieces $u_c$ (corresponding to the relay contact-arms $u^{II}_w$ and $u^{II}_r$) of the switch. Thence the current is led, according to the position of the switch, either to the terminals W of the lanterns II II' or to the terminals R of said lanterns, the reversal of the connection being effected by the switching in of the relay Z', so that in the lower lanterns the annular shutters are raised and lowered alternately for the white and the red light. If it is not desired to have any difference in the length of the intervals between intermittent and alternating light-signals, a single relay is sufficient, whose switch must then of course have seven contact-arms in place of five. In this case one contact-ring is omitted in the signal-transmitter and the relay contact-ring is placed in circuit at each intermittent or alternating signal. Of course the corresponding supply-leads are dispensed with.

In mounting the lanterns—as, for example, on a ship—care should always be taken that the greatest linear distance or distance of lanterns is obtained.

As the lanterns, by reason of their construction, emit equal amounts of light all around, they can be employed to give signals that will be visible simultaneously around the whole horizon without it being necessary to rotate the lanterns and, further, as the lanterns mounted at the top are, by reason of their suspension from a support projecting above the mast, visible from all sides it will be sufficient to employ only one upper signaling element, which, in combination with two lower signaling elements situated fore and aft on deck and suitably shaded with relation to each other, forms two signaling-stations consisting only of three lanterns. Thus with this night signaling apparatus and utilizing the greatest possible lantern distance the same signals can be given at the same time around the entire horizon with the aid of only three signaling elements.

Figure 20:
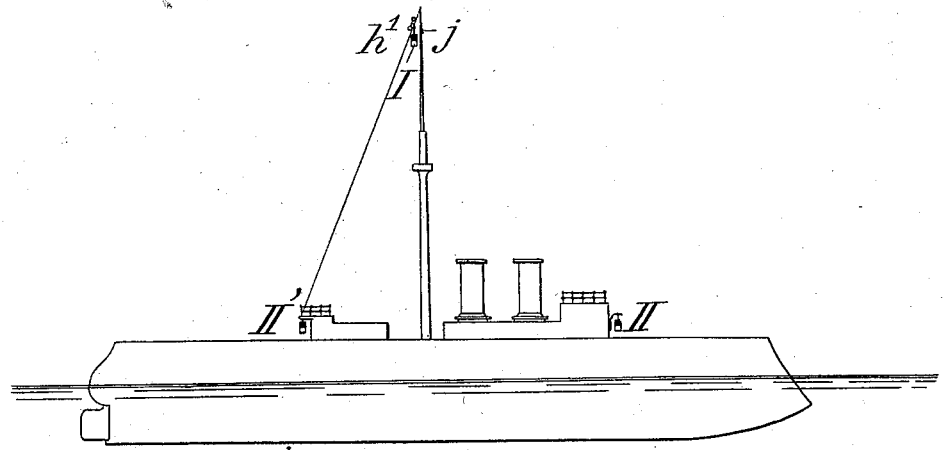
Figure 21:
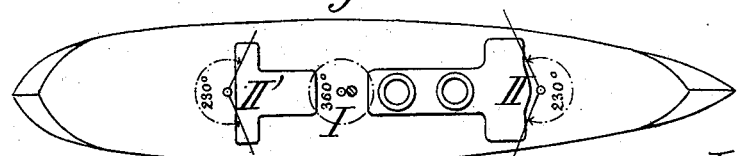

If signals are to be given only with the signaling elements of one or the other station, which signals therefore are visible only over a determined portion of the horizon, there is fitted on the upper lantern a shade which shuts off the light on the desired side. Figs. 20 and 21 illustrate this signaling apparatus with only three lanterns on a ship with only one mast. I is the upper lantern, which is situated at the top of the mast and is visible from all sides and belongs to the two signal-stations. II II' are the lower lanterns. The mode of suspension of the lanterns on gimbals serves to insure the horizontal emission of the light in spite of the plunging of the ship. The lower lanterns are always mounted at a height such that they can be seen by the person signaled at the maximum signaling distance. Of course they can serve for signaling either fore and aft or to starboard and to port, according as they are arranged.

Figure 22:
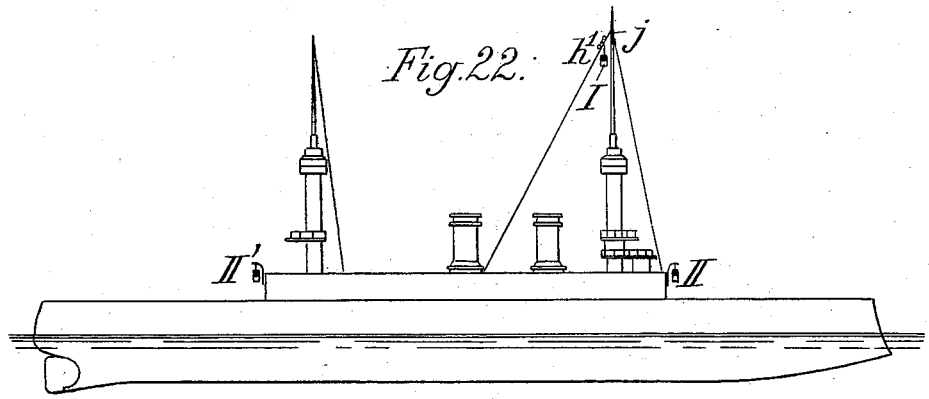
Figure 23:
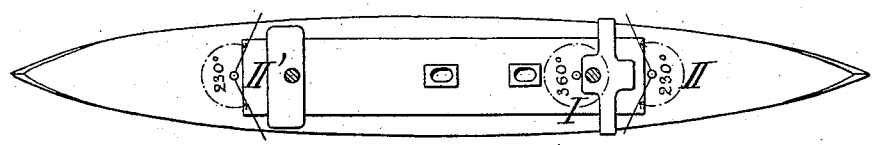

Figs. 22 and 23 illustrate the arrangement of the two signal-stations (consisting together of three lanterns) for ships with two or more masts, the upper lantern I being arranged in the same manner as before upon the higher or highest mast.

Having now particularly described and ascertained the nature of my said invention and in what manner the same is to be performed, I declare that what I claim is—

1. A signaling element consisting of a cylindrical lantern having superposed uninterrupted light-transmitting zones, a constant source of light in the plane of each of said zones, a circular shutter interposed between each zone and its source of light, a shifting mechanism for each shutter and means for operating said shifting mechanisms independently of each other, whereby one or the other of the two sources of light can be continuously or intermittently exposed, or both sources alternately exposed, for the purpose set forth.

2. A signaling element consisting of a cylindrical lantern having superposed uninterrupted light-transmitting zones, a constant source of light, in the plane of each of said zones, a circular shutter interposed between each zone and its source of light, a shifting mechanism and one or more electromagnets for each shutter adapted to be included in separate electric circuits, said magnets having movable cores connected with their respective shutter-shifting mechanisms, for the purpose set forth.

3. A signal light or lights, electric appliances adapted to render visible or obscure such light or lights, and an electric circuit including said appliances; in combination with a signal-transmitter provided with signal-indices, circuit-closing devices, a transmitting-lever shiftable from one to the other signal-indices and operating the circuit-closing devices and therethrough the electrical appliances to produce a signal corresponding with the index to which the lever is shifted, and an automatic cut-out operating to cut out the circuit-closing devices whenever said lever is shifted and again restore said devices, for the purpose set forth.

4. A signal light or lights, electrically-operated appliances adapted to render visible or obscure said light or lights, and an electric circuit or circuits including said appliances; in combination with a signal-transmitter provided with signal-indices, a circuit-closing device or devices, a transmitting-lever shiftable from one to the other of said indices and operating said circuit-closing device or devices and therethrough the electrically-operated appliances to produce a signal corresponding with the index to which the lever is shifted, and an automatic cut-out for cutting the electrically-operated appliances out of the electric circuit whenever the said lever is shifted from one signal-index to another.

5. A signal light or lights, electrically-operated appliances adapted to render visible or obscure said light or lights, a signal-transmitter comprising a casing, provided in its cover with transparent signal-indices, a transmitting-lever shiftable from one to the other of said indices, an electric circuit or circuits including the aforesaid appliances, and a circuit-closing device or devices controlled by the transmitting-lever; in combination with a signal-recorder in the transmitter-casing comprising a record-ribbon-feed mechanism and a record-producing device operated by the movements of the transmitting-lever, for the purpose set forth.

6. An electrically-operated signal-producer, a signal-transmitter comprising a casing provided with an opening in its vertical wall for the passage of a record-ribbon and having signal-indices in its cover, an electric circuit including the signal-producer, a transmitting-lever shiftable from one signal-index to another, and a circuit-closer controlled by the aforesaid lever; in combination with a recorder comprising a record-ribbon-feed mechanism and a record-producer also controlled by the lever, and arranged to produce the record at a point proximate to the aforesaid opening in the casing-wall, said feed mechanism operating to feed the ribbon after each record so as to expose the latter to view outside of the casing, for the purpose set forth.

7. A signal light or lights, electrically-operated appliances adapted to render visible or obscure said light or lights, a signal-transmitter comprising a casing provided in its cover with transparent signal-indices, a transmitting-lever shiftable from one to the other of said indices, a constant source of light within the casing, an electric circuit or circuits including the aforesaid appliances, and a circuit-closing device or devices controlled by the transmitting-lever; in combination with a signal-recorder in the transmitter-casing comprising a record-ribbon-feeding mechanism adapted to feed the ribbon through an opening in the casing, and a record-producer, said ribbon-feeding mechanism and record-producer operated by the transmitting-lever, and a reflector in the plane of the aforesaid source of light over which the record-ribbon moves, for the purpose set forth.

8. The transmitter-casing $k$, the hinged and rotatable lever $o$, the spindle $o^2$ secured thereto and carrying at its lower end the spring-actuated resilient cut-out $p$, and a contact-cylinder provided with discoidal contacts $l$; in combination with the two-part contact-sleeve $q$, substantially as and for the purpose set forth.

9. The rotatable and vertically-movable transmitting-lever $o$, the spindle $o^2$ secured to said lever, and the type-wheel $r$ fast on said spindle and provided with a depending rod $o^0$; in combination with the contact-cylinder engaged by said rod $o^0$, and a bearing on which said cylinder is revolubly mounted, for the purpose set forth.

10. The transmitting-lever $o$, the spindle $o^2$ secured thereto, the record-wheel $r$ having record-producing devices on its under side near its periphery, and the impression-table $u$; in combination with the ribbon-reel $t^5$, the feed-rolls $t'$, $s^8$, the ratchet $s^7$ fast on shaft of roll $s^8$, the spring-controlled lever $s^2$, the pawl-lever $s^5$ linked to lever $s^2$, the pawl $s^9$ pivoted to lever $s^5$ and eagaging the ratchet $s^7$, and the rod $r^2$ actuated by the type-wheel and actuating lever $s^2$ to impart a reciprocating motion to the aforesaid pawl, substantially as and for the purpose set forth.

11. A signal-light, electric appliances adapted to render visible or obscure such light and an electric circuit including said appliances; in combination with a signal-transmitter comprising a casing provided in its cover with transparent signal-indices arranged in a circle, a source of light, and circuit-closing devices within the casing, and a transmitting-lever shiftable on the cover of the casing from one to the other signal-indices and operating the circuit-closing devices and therethrough the light-controlling appliances to produce a signal corresponding with the signal-index to which the lever has been shifted, for the purpose set forth.

12. A signal-light, electrical appliances adapted to render visible or obscure such light, and an electric circuit including said appliances; in combination with a signal-transmitter, comprising a casing provided in its cover with transparent signal-indices arranged in a circle, a source of light, and circuit-closing devices within the casing, a transmitting-lever shiftable on the cover of the casing from one to the other signal-indices and operating the circuit-closing devices and therethrough the light-controlling appliances to produce a signal corresponding with the signal-index to which the lever has been shifted, and a cut-out operated by said lever, whenever shifted, to cut out the circuit-closing devices, for the purpose set forth.

13. A signal-light, electrical appliances adapted to render visible or obscure such light, and an electric circuit including said appliances; in combination with a signal-transmitter comprising a casing provided in its cover with transparent signal-indices arranged in a circle, a source of light, and circuit-closing devices therein, consisting of revoluble conductive toothed disks insulated from one another, contact-brushes adapted to contact with the teeth of the disks only, said devices included in the electric circuit, and a transmitting-lever revoluble on the cover over the signal-indices, and a connection between said lever and the revoluble disks, for the purpose set forth.

14. An illuminated signal lantern or lanterns, electric appliances adapted to render visible or obscure the light in said lanterns, and an electric circuit including said appliances; in combination with a signal-transmitter comprising a casing provided in its cover with transparent signal-indices $n'\ n^2\ n^3$, incandescent lamps in said casing included in the electric circuit, a cut-out for said lamps, circuit-closing devices consisting of a number of toothed disks $l$ sufficient to produce the signals indicated on the cover, said disks insulated from each other and revoluble about a common axis, a corresponding number of contact-brushes adapted to contact with the teeth of their respective disks only, a pair of stationary contacts below said disks electrically connected therewith and with the brushes respectively, a transmitting-lever revoluble on and movable vertically relatively to said cover, means for locking the lever against rotation when positioned to a given signal, a spindle secured to said lever, a contact thereon adapted to electrically connect the aforesaid brush and disk contacts to close the circuit when said lever is depressed and to break such circuit when the lever is lifted, and means controlled by the lever to revolve the disks, substantially as and for the purpose set forth.

15. The combination with the transmitter, the revoluble and vertically-shiftable transmitting-lever $o$, its spindle $o^2$ and a recording-wheel $r$ secured to said spindle and provided with signal-reproducers $r'$ corresponding in number with the number of signal-indices on the transmitter-cover; of a record-ribbon drum and a feed mechanism for feeding the ribbon in a fixed direction below the recording-wheel whenever the transmitting-lever is positioned to transmit a signal, whereby a permanent record of the transmitted signals is made in the ribbon, for the purpose set forth.

16. The combination with the transmitter provided with a hinged reflector $v$, an illuminating device arranged to throw light upon the reflecting-surface, the revoluble and vertically-shiftable transmitting-lever $o$, its spindle $o^2$ and a recording-wheel $r$ secured to said spindle and provided with signal-reproducers $r'$ corresponding in number with the number of signal-indices on the transmitter-cover; of a record-ribbon drum and a feed mechanism for feeding the ribbon over the reflecting-surface below the recording-wheel whenever the transmitting-lever is positioned to transmit a signal, whereby a permanent record of such signal is recorded and the preceding recorded signal rendered visible, substantially as set forth.

17. The combination with the transmitter, the revoluble and vertically-shiftable transmitting-lever $o$, its spindle $o^2$ and a recording-wheel $r$ secured to said spindle and provided with signal-reproducers $r'$ corresponding in number with the signal-indices on the transmitter-cover; of a record-ribbon drum, and a feed mechanism for feeding the ribbon in a fixed direction below the recording-wheel whenever the transmitting-lever is lifted in positioning the same, and means for throwing the feed mechanism out of operation when said lever is lowered into position to transmit a signal, whereby said record-wheel is likewise depressed and a permanent record made of the signal transmitted, for the purpose set forth.

18. The combination with the transmitter, the revoluble and vertically-shiftable transmitting-lever $o$, its spindle $o^2$ and a recording-wheel $r$ secured to said spindle and provided with signal-reproducers $r'$ corresponding in number with the signal-indices on the transmitter-cover; of a record-ribbon drum, and a feed mechanism for feeding the ribbon in a fixed direction below the recording-wheel whenever the transmitting-lever is lifted in positioning the same, a holdfast for the ribbon and means for operating the holdfast and simultaneously therewith throwing the feed mechanism out of operation when said lever is lowered into position to transmit a signal, whereby said record-wheel is likewise depressed and a permanent record made of the signal transmitted, for the purpose set forth.

19. The combination with the transmitter provided in its vertical wall with an outwardly-inclinable reflector $v$, the revoluble and vertically-shiftable transmitting-lever $o$, its spindle $o^2$, a recording-wheel of substantially the same diameter as the interior diameter of the transmitter-casing and provided in its rim close to the transmitter-walls with signal-reproducers $r'$ corresponding in number with the number of signal-indices on the transmitter-cover, and a source of light within the transmitter thrown upon the aforesaid reflector; of a record-ribbon drum, a feed mechanism for feeding the record-ribbon over the reflector, a holdfast for the record-ribbon, intermediate mechanisms operated by the transmitting-lever and operating the feed mechanism when said lever is lifted and operating the holdfast when said lever is lowered into position to transmit a signal, the record-wheel being simultaneously depressed to form a permanent record of the transmitted signal, substantially as and for the purpose set forth.

20. The combination with the transmitter provided in its vertical wall with an opening, and a hinged reflector $v$ adapted to close said opening, the record-ribbon-feed mechanism and the devices actuating the same; of means for throwing said feed mechanism automatically out of operation when said reflector is closing the aforementioned opening, for the purpose set forth.

21. The combination with the transmitter provided in its vertical wall with an opening, a hinged reflector $v$ adapted to close said opening, the record-ribbon-feed mechanism and the devices actuating the same; of a locking-bolt for locking the reflector closed and means operated by said bolt for throwing the ribbon-feed mechanism out of operation when said bolt is operated to lock said reflector closed, substantially as set forth.

22. A signaling apparatus comprising a plurality of signal elements each provided with light-transmitting zones of unlike color, an illuminating device for each of said zones, electrically-operated appliances for exposing and obscuring the illuminating devices, and suitable electric circuits and circuit-closers, in combination with a cut-out in said circuits operating automatically to alternately cut out and reinstate the circuit-closers in the production of successive signals or signal-symbols, for the purpose set forth.

23. A signaling apparatus comprising a plurality of signal elements each provided with light-transmitting zones of unlike color, an illuminating device for each of said zones, electrically-operated appliances for exposing and obscuring the illuminating devices, suitable electric circuits and circuit-closers, and a transmitting-lever controlling said circuit-closers, in combination with a cut-out operating automatically to alternately cut out and reinstate the circuit-closers when the lever is shifted to produce successive signals or signal-symbols, for the purpose set forth.

24. A signaling apparatus comprising a plurality of signal elements each provided with light-transmitting zones of unlike color, an illuminating device for each of said zones, electrically-operated appliances for exposing and obscuring the illuminating devices, suitable electric circuits and circuit-closers, in combination with a cut-out controlled by said transmitting-lever and operating automatically to alternately cut out and reinstate the circuit-closers when the lever is shifted to produce successive signals or signal-symbols, for the purpose set forth.

25. A signaling apparatus comprising a plurality of signal elements each provided with light-transmitting zones of unlike color, an illuminating device for each of said zones, electrically-operated appliances for exposing and obscuring the illuminating devices, suitable electric circuits and circuit-closers, and a transmitting-lever controlling said circuit-closers, in combination with a cut-out operating automatically to alternately cut out and reinstate the circuit-closers, one element of said cut-out connected with the lever, and moved out of and into contact with the other element alternately when said lever is shifted to produce successive signals, for the purpose set forth.

26. A signaling apparatus comprising three signal elements composed of two signal-lights of unlike color, a shutter for each of said lights, shutter-shifting appliances and electromagnets for operating said appliances, electric circuits including said electromagnets, and electrically-controlled switches interposed in the circuits of the electromagnets of two of the signal elements operating to produce intermittent and alternate color-signal symbols respectively; in combination with a circuit-closer interposed in the circuits of the electromagnets for one of the signal elements and in the circuits of the electrically-controlled switches for the other two elements, a transmitting-lever controlling said circuit-closer and an automatic cut-out controlled by the transmitting-lever to automatically cut out the circuit-closer when said lever is being shifted, substantially as set forth.

27. A signaling apparatus comprising three signal elements composed of two signal-lights of unlike color, a shutter for each of said lights, shutter-shifting appliances and electromagnets for operating said appliances, electric circuits including said electromagnets, electrically-controlled switches interposed in the circuits of the electromagnets of two of the signal elements operating to produce intermittent and alternate color-signal symbols respectively and appliances for determining the duration of said symbols; in combination with a circuit-closer interposed in the circuits of the electromagnets for one of the signal elements and in the circuits of the electrically-controlled switches for the other two elements, and a transmitting-lever controlling said circuit-closer, for the purpose set forth.

28. A night signal-station consisting of three signal elements each composed of two signal-lights of unlike color arranged relatively to each other to render the signals visible from all points of the compass, electric appliances adapted to render visible or obscure the lights, a signal-transmitter, an electric circuit including said lights and transmitter, and suitable electrical connections between them to transmit and produce signals in one of the elements; in combination with relays in said electric circuit, suitable electrical connections between said relays and the aforementioned electrical appliances and transmitter to transmit and produce signal-symbols simultaneously in said three elements, and like symbols in at least two of them, and a recording instrument adapted to automatically record the different signals as they are transmitted, for the purpose set forth.

29. A night signal-station consisting of three signal elements each composed of two signal-lights of unlike color arranged relatively to each other to render the signals visible from all points of the compass, electric appliances adapted to render visible or obscure the lights, a signal-transmitter, an electric circuit including said lights and transmitter, and suitable electrical connections between them to transmit and produce signals in one of the elements; in combination with relays in said electric circuit, suitable electrical connections between said relays and the aforementioned electrical appliances and transmitter to transmit and produce signal-symbols simultaneously in said three elements and like symbols in at least two of them, a recording instrument adapted to automatically record the different signals as they are transmitted, and means for rendering visible the recorded signals, for the purpose set forth.

30. A night signal-station consisting of three signal-lanterns each adapted to emit flashes of light of unlike color, electric lights in said lanterns, electric appliances adapted to produce the flashes, a signal-transmitter provided with transparent signal-indices, an electric lamp or lamps illuminating said indices, an electric circuit including said appliances, a transmitting-lever, a suitable circuit-closer operated by said lever, and suitable electric connections to transmit and produce flash-signals in one of the elements and signal-symbols in all three elements simultaneously; in combination with a cut-out operated by the transmitter to cut the circuit-closing devices out, and separate cut-outs for cutting out the lantern and transmitter lights, for the purpose set forth.

31. In a signaling system such as described, a relay consisting of an electromagnet, its armature, stationary contacts $u^a$ $u^c$ arranged in arcs of circles, and a rocking segment-switch U provided with radial contacts $u^I_r$ $u^{II}_r$, $u^I_w$ $u^{II}_w$ and $u_z$ and bridges $u^b$, of intermediate mechanism operated by the armature when the electromagnet is energized to revolve the switch in one direction and interrupt the electric circuit, and a retracting-spring connected with the armature for returning the latter and the switch through the intermediate connections into their normal positions when said electromagnet ceases to be energized, for the purpose set forth.

32. In a signaling system such as described, a relay consisting of an electromagnet, its armature, stationary contacts $u^a$ $u^c$ arranged in arcs of circles, and a rocking segment-switch U provided with radial contacts $u^I_r$ $u^{II}_r$, $u^I_w$ $u^{II}_w$ and $u_z$ and bridges $u^b$; of intermediate mechanism operated by the armature when the electromagnet is energized to revolve the switch in one direction and interrupt the electric circuit, means for retarding the rotation of said switch, and a retracting-spring connected with the armature for returning the latter and the switch through the intermediate connections into their normal positions when said electromagnet ceases to be energized, for the purpose set forth.

33. The combination with the rock-shaft $z^6$ carrying the switch U, the counterbalance-lever $z^5$ secured to said shaft and provided with a tappet 2, the electromagnet $z$, its armature $z'$, the retracting-spring $z^8$, the drop-lever $z^3$, a spring connection between the free end of said drop-lever and that of the counterbalance-lever, and a connection between said drop-lever and the armature $z'$; of the air-cylinder 5 provided with a longitudinally-slotted rod 5', the piston 6 and the rock-lever 4 provided with tappets 3 and 3' coöperating with the tappet 2 on lever $z^5$, said rock-lever in engagement with the air-cylinder rod and said drop-lever and armature connection connected with said cylinder-rod through the slot thereof, substantially as and for the purpose set forth.

34. The combination with the electromagnet Z, its armature and retracting-spring $Z^8$, the pneumatic cylinder 5 provided with a slotted rod 5', the piston 6, and a sector-shaped contact-plate having radial contacts as $u^a$ $u^c$; of the sector-shaped rocking switch U provided with radial contacts $u^I_r$ $u^{II}_r$, $u^I_w$, and $u^{II}_w$, coöperating with the aforesaid contacts, the weighted pallet-lever $z^5$, fast on axis of said switch, the lever $z^3$, spring or springs $z^4$ connecting said lever with the pallet-lever, said lever $z^3$ linked to the electromagnet-armature, and the pallet-lever 4 connected with the rod 5' of the pneumatic cylinder 5 and carrying spring-controlled pallets 3 and 3', substantially as and for the purpose set forth.

In testimony whereof I affix my signature in presence of two witnesses.

LEOPOLD SELLNER.

Witnesses:
VICTOR KAR,
SAMUEL KLUTSCHKO.